United States Patent
Huey, Jr.

[15] 3,704,472
[45] Dec. 5, 1972

[54] FLOAT FOR A ONE MAN HUNTING BLIND

[72] Inventor: Stanton E. Huey, Jr., 2128 Maywood Drive, Monroe, La. 71201

[22] Filed: Jan. 18, 1971

[21] Appl. No.: 107,261

[52] U.S. Cl. ............................................9/5, 9/2 A
[51] Int. Cl. ..............................................B63b 7/08
[58] Field of Search ....................9/5, 2 A, 2 S, 2 R, 7

[56] References Cited

UNITED STATES PATENTS

| | | | |
|---|---|---|---|
| 2,327,169 | 8/1943 | Bucknell | 9/5 |
| 2,327,168 | 8/1943 | Bucknell | 9/5 |
| 315,297 | 4/1885 | Kenly | 9/5 |
| 550,762 | 12/1895 | Murphy et al. | 9/5 |

*Primary Examiner*—Milton Buchler
*Assistant Examiner*—Carl A. Rutledge

[57] ABSTRACT

A blind for shooting duck or other game, the device comprising a circular plywood panel which is secured upon a tractor tire inner tube and secured thereto by leather belts, and the base having a central dry well made of a 55 gallon oil drum, the device being provided with eight anchor lines of nylon belts which lead to eight anchors.

2 Claims, 2 Drawing Figures

PATENTED DEC 5 1972 3,704,472

INVENTOR.
STANTON E. HUEY, JR.

FLOAT FOR A ONE MAN HUNTING BLIND

This invention relates generally to blinds for hunters.

A principal object of the present invention is to provide an improved floating base for a one man hunting blind which may be floated upon the water and anchored, the blind being stable enough to shoot off it in a standing position and which has been proven to permit shooting from the blind also while sitting down thereupon so as to give the hunter more stability and also to not scare away the game.

Another object of the present invention is to provide a floating base for a one man hunting blind which can be propelled either by a push-pull, a paddle, or an electric motor.

Yet another object of the present invention is to provide a floating base for a one man hunting blind and upon which a hunter may direct a canvass enclosure so to hide the hunter from the game such as ducks or geese.

Yet another object of the present invention is to provide a floating base for a one man hunting blind which is readily collapsable so that it can be conveniently transported to and from a hunting area in the trunk of a conventional automobile, and wherein the conversion between an erected and collapsed position can be accomplished in a quick and easy manner.

Yet another object of the present invention is to provide a floating base for a one man hunting blind which alternately can be used for other purposes such as transporting equipment across a river, for raising objects from a water bottom, for entering and leaving the water from the float while scuba diving, and also by using the same as a platform while swimming and diving.

Other objects of the present invention are to provide a floating base for a one man hunting blind which is simple in design, inexpensive to manufacture, rugged in construction, easy to use and efficient in operation.

These and other objects will be readily evident upon a study of the following specification and the accompanying drawing wherein.

Figure 1:
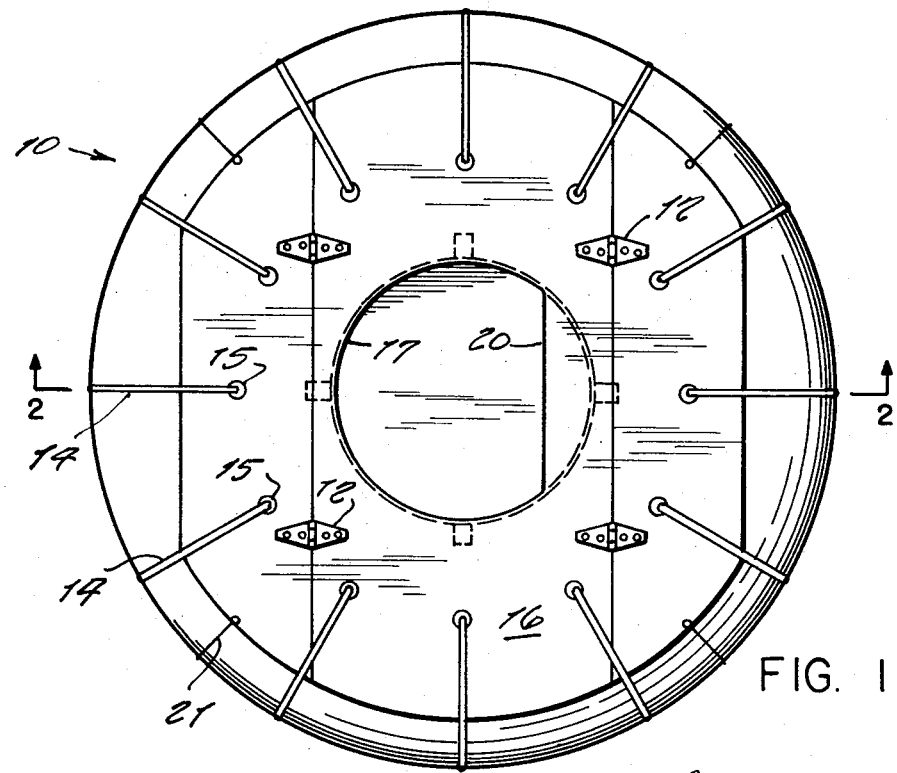
FIG. 1 is a top plan view of the present invention.
Figure 2:
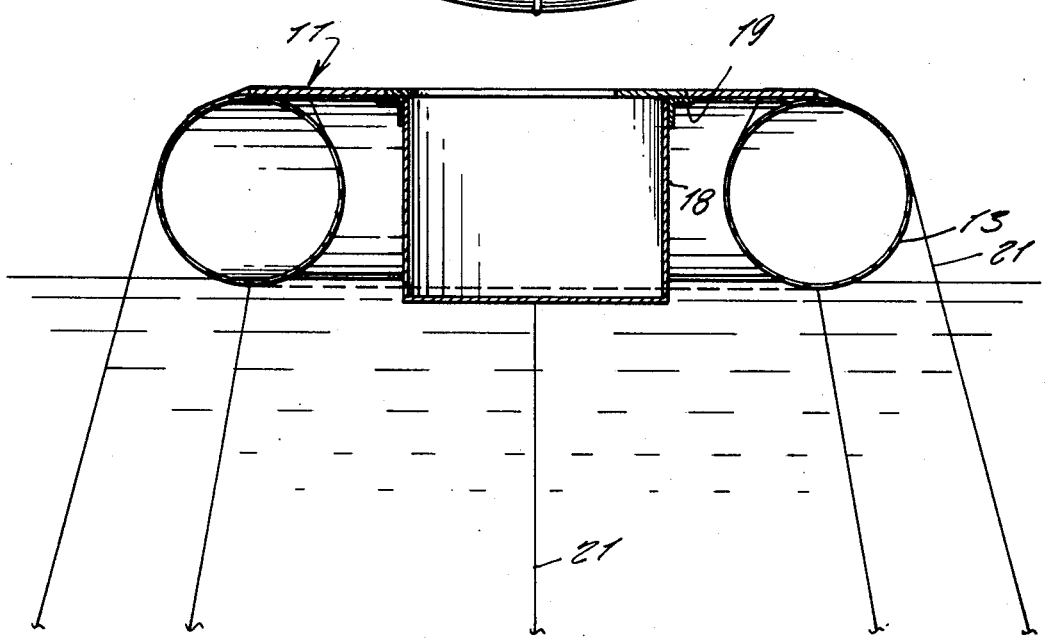
FIG. 2 is a cross-sectional view taken on the line 2—2 of FIG. 1 and showing the device afloat upon the surface of a body of water.

Referring now to the drawing in detail, the reference numeral 10 represents a floating base for a one man hunting blind according to the present invention wherein there is a base 11 comprising a circular platform which is made of several plywood panels positioned adjacent the side edges thereof and secured together by means of hinges 12 so that the platform is readily collapsable in size thereby permitting the device to be readily transported within a trunk of a conventional automotive vehicle.

Upon the under side of the platform 11 there is a tractor tire inner tube 13 which is secured thereto by means of 12 leather belts 14 that are fitted through openings 15 of the platform 11 and which are passed around the underside of the inner tube 13.

The central panel 16 of the platform 11 has a central opening 17 therein below which there is secured a 55 gallon oil drum 18 by means of angle brackets 19, the oil drum serving as a dry well into which a hunter may place his legs and feet.

A 4 inch projection 20 formed along the opening 17 of the panel 16 serves as a seat for the hunter.

A plurality of eight anchor lines 21 are connected to the device, the opposite ends of the anchor lines being connected to anchors. Each of the anchor lines are made of nylon belts.

It is now evident that in operative use the floating base for a one man hunting blind serves a particularly advantageous use.

What I now claim is:

1. In a floating base for a one man hunting blind, the combination of a generally circular platform secured upon a tractor tire inner tube which in an inflated position will float upon a surface of water, a central dry well extending downwardly from said platform, and means for anchoring the device while afloat, said platform being comprised of a plurality of plywood panels, said panels being adjacent their side edges so as to form a central panel and a pair of end panels, said end panels and said central panel being enjoined together by means of hinges so that said platform can be readily collapsed so to be transportable within a truck compartment of an automotive vehicle, a periphery of said platform being generally rounded, said central platform having a central opening there through defining an opening to said dry well, said platform being secured to said inner tube by means of a plurality of leather belts which are each inserted through an opening through said platform and being fitted around said inner tube, said dry well comprising an oil drum secured to an under side of said platform by means of angle brackets, said oil drum being in axial alignment with said opening in said panel of said platform.

2. The combination as set forth in claim 1, wherein said anchor means comprises a plurality of eight anchors secured to said device by means of individual anchor lines, each of said anchor lines being made of nylon belts.

* * * * *